(12) United States Patent
Nagai et al.

(10) Patent No.: US 8,699,006 B2
(45) Date of Patent: Apr. 15, 2014

(54) MEASURING METHOD AND MEASURING INSTRUMENT

(75) Inventors: Katsuyuki Nagai, Tokyo-to (JP); Hajime Honda, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 131 days.

(21) Appl. No.: 13/182,670

(22) Filed: Jul. 14, 2011

(65) Prior Publication Data
US 2012/0081690 A1 Apr. 5, 2012

(30) Foreign Application Priority Data

Sep. 30, 2010 (JP) ................................ 2010-220185

(51) Int. Cl.
*G01C 3/08* (2006.01)

(52) U.S. Cl.
USPC ....... 356/4.01; 356/3.01; 356/5.01; 356/5.09; 356/9; 356/496; 356/625; 235/414; 348/135; 396/89

(58) Field of Classification Search
USPC ......... 356/4.01, 3.01, 5.01, 5.09, 9, 496, 625; 235/414; 348/135; 396/89
See application file for complete search history.

(56) References Cited

U.S. PATENT DOCUMENTS

| 6,559,931 | B2* | 5/2003 | Kawamura et al. | .......... | 356/4.01 |
| 6,584,213 | B2* | 6/2003 | Prakash et al. | ................. | 382/107 |
| 7,750,849 | B2* | 7/2010 | Hjelmstad | ..................... | 342/417 |
| 7,832,137 | B2* | 11/2010 | Sammut et al. | ................. | 42/111 |
| 2003/0048438 | A1 | 3/2003 | Kawamura et al. | | |
| 2004/0252313 | A1 | 12/2004 | Labat et al. | | |
| 2009/0138233 | A1* | 5/2009 | Kludas et al. | ................. | 702/158 |
| 2012/0081691 | A1 | 4/2012 | Nagai | | |

FOREIGN PATENT DOCUMENTS

| JP | 3-125926 | A | 5/1991 |
| JP | 4-178514 | A | 6/1992 |
| JP | 8-136218 | A | 5/1996 |
| JP | 10-47959 | A | 2/1998 |
| JP | 2879578 | B2 | 4/1999 |
| JP | 2003-279352 | A | 10/2003 |

OTHER PUBLICATIONS

European Search Report mailed May 14, 2013 in corresponding European Patent Application No. EP 11005840.1.

* cited by examiner

*Primary Examiner* — Isam Alsomiri
*Assistant Examiner* — Samantha K Abraham
(74) *Attorney, Agent, or Firm* — Nields, Lemack & Frame, LLC (57) ABSTRACT

The invention provides a measuring instrument, comprising a telescope, a distance measuring unit, an image pickup unit, angle detecting units for detecting a vertical and horizontal angle in the sighting direction, an automatic sighting unit, an arithmetic unit, and a storage unit. The arithmetic unit makes the telescope rotate in horizontal and vertical direction and perform scanning over a predetermined range so that a plurality of objects to be measured are included and makes the image pickup unit acquire digital images during the scanning process. The arithmetic unit detects the objects in the digital images, calculates a vertical and horizontal angle of the objects based on the angle detector and a deviation of each of the objects from sighting axis, associates the calculated angles with each of the objects, and makes the storage unit store the vertical and horizontal angles of the objects as target values for automatic sighting.

4 Claims, 6 Drawing Sheets

MEASURING METHOD AND MEASURING INSTRUMENT

BACKGROUND OF THE INVENTION

The present invention relates to a measuring method and a measuring instrument to measure a multiple number of points periodically or continuously over time.

For the purpose of observing the sinking of ground, of observing landslide, of observing displacement of banks and walls of construction work such as a dam, of observing displacement of wall surface of a tunnel, measurement is performed periodically or continuously over time by using a measuring instrument on a multiple number of measuring points, which are set up in a measurement range.

For instance, in case where a tunnel is to be constructed to build underground railway, for the purpose of observing whether ceiling and wall surface of the tunnel constructed may not be displaced or not, a multiple number of prisms are installed on the ceiling and on the wall surface as targets, and positional displacement of all these prisms are measured one after another without operator intervention by using a measuring instrument (hereinafter, this is referred as "monitoring measurement").

When the monitoring measurement is performed, the measuring instrument automatically searches the prisms, i.e. the measuring points, performs sighting, measures distances, and carries out the measuring operation. In order to acquire initial values to search the measuring points thus set up, it is necessary to carry out teaching operations on each of the measuring points.

In a conventional teaching operation, an operator performs sighting each of the measuring points by using a measuring instrument, measures a horizontal angle, a vertical angle and a distance with respect to each of the measuring points, performs three-dimensional measurement with respect to each of the measuring points and sets up the obtained results of the measurement as initial values of each measuring point respectively. According to this method, the operator measures the measuring points one by one. Further, because a view angle of a sighting telescope provided on the measuring instrument is narrow, much time is required for sighting and the working efficiency is low. As a result, much time is required. In particular, in case where the time for the measuring operation is limited, e.g. in case where the operation is performed in a tunnel for underground railway, the measuring operation must be finished during the time period when the railway is not in operation in order to perform monitoring measurement on ceiling and wall surface of the tunnel, and so the measuring time is required to be shortened.

Or, there is an another method as follows. The measuring instrument comprises a wide-angle camera and takes the images of the measurement range by the wide-angle camera. Then, the measuring instrument extracts the measuring points from the acquired images through images processing, detects positions of the measuring points. Based on the positions of the measuring points obtained from the images, the measuring instrument performs sighting of the measuring points, and after the sighting, the measuring instrument measures a horizontal angle, a vertical angle and a distance with respect to each of the measuring points.

In this case, if the range of image pickup is extended in wider range or if a measuring point is at a long distance, the accuracy to detect the measuring point is decreased. Also, optical axis of the wide-angle camera and the telescope of the measuring instrument are offset, and it is necessary to correct the results detected by the wide-angle camera. The amount of correction is a function of the distance, and if the detection of the measuring point in the image processing is not associated with distance measurement, the accuracy is decreased. For this reason, there have been problems in the past that sighting by the measuring instrument cannot be performed.

SUMMARY OF THE INVENTION

It is an object of the present invention to provide a measuring method and a measuring instrument, by which it is possible to acquire position data of an object to be measured in simple manner and within short time when the monitoring measurement is carried out.

To attain the above object, the invention provides a measuring method for performing monitoring measurement on a plurality of objects to be measured by a measuring instrument, which comprises a telescope for performing sighting on the objects to be measured, a distance measuring unit for measuring a distance to each of the objects to be measured by projecting a distance measuring light through the telescope, an image pickup unit for taking an image in sighting direction and for acquiring a digital image, angle detecting units for detecting a vertical angle and a horizontal angle in the sighting direction of the telescope, and an automatic sighting unit for making the telescope perform automatic sighting to the objects to be measured, comprising a step of rotating the telescope in horizontal direction and in vertical direction and of scanning over a predetermined range as set so that a plurality of objects to be measured are included, a step of acquiring digital images with a predetermined time interval in the process of scanning, a coarse measuring step of detecting the objects to be measured in the digital image and of calculating a vertical angle and a horizontal angle of each of the objects to be measured based on a deviation of the objects to be measured on the digital image from sighting axis, and also, based on the results of detection from the angle detecting unit, and a step of associating the calculated vertical and horizontal angles with each of the objects to be measured and of storing the vertical and horizontal angles as target values for automatic sighting.

Also, the present invention provides the measuring method as described above, further comprising a precise measuring step of making the telescope perform the automatic sighting on the objects to be measured one after another based on the stored vertical angles and the stored horizontal angles and of performing distance measurement and angle measurement, and a step of associating the result of measurement obtained in the precise measurement with each of the objects to be measured and of acquiring the result of measurement as initial values. Further, the present invention provides the measuring method as described above, wherein a scanning speed and a time interval of image pickup are set in such manner that images of each of the objects to be measured are included in at least two digital images adjacent to each other in terms of time.

Also, the invention provides a measuring instrument, comprising a telescope for performing sighting on objects to be measured, a distance measuring unit for measuring a distance to each of the objects to be measured by projecting a distance measuring light through the telescope, an image pickup unit for taking an image in sighting direction and for acquiring a digital image, angle detecting units for detecting a vertical angle and a horizontal angle in the sighting direction of the telescope, an automatic sighting unit for making the telescope perform automatic sighting to the objects to be measured, an arithmetic unit, and a storage unit, wherein the arithmetic unit makes the telescope rotate in horizontal direction and in vertical direction and perform scanning over a predetermined range as set so that a plurality of objects to be measured are included and makes the image pickup unit acquire digital images at a predetermined time interval in the process of scanning, and the arithmetic unit detects the objects to be measured in the digital images thus acquired, calculates a vertical angle and a horizontal angle of the objects to be measured based on the vertical angle and the horizontal angle detected by the angle detector and also based on a deviation of each of the objects to be measured on the digital images from sighting axis, associates the calculated vertical and horizontal angles with each of the objects to be measured, and makes the storage unit store the vertical angles and the horizontal angles of the objects to be measured as target values for automatic sighting.

Further, the invention provides a measuring instrument as described above, wherein the arithmetic unit makes the automatic sighting unit automatically perform sighting of the telescope sequentially on the objects to be measured based on the target values stored in the storage unit, executes precise measurement for distance measurement and angle measurement, associates the result of measurement obtained in the precise measurement with the objects to be measured and acquires the result of measurement as initial values.

Also, the invention provides a measuring instrument as described above, wherein the arithmetic unit takes images so that images of the objects to be measured are included in at least two digital images adjacent to each other in terms of time, and averages the vertical angles and the horizontal angles obtained with respect to the images of the objects to be measured in at least the two digital images.

Further, the invention provides a measuring method for performing monitoring measurement on a plurality of objects to be measured by a measuring instrument, which comprises a telescope for performing sighting on the objects to be measured, a distance measuring unit for measuring a distance to each of the objects to be measured by projecting a distance measuring light through the telescope, an image pickup unit for taking an image in sighting direction and for acquiring a digital image, angle detecting units for detecting a vertical angle and a horizontal angle in the sighting direction of the telescope, and an automatic sighting unit for making the telescope perform automatic sighting to the objects to be measured, comprising a step of rotating the telescope in horizontal direction and in vertical direction and of scanning over a predetermined range as set so that a plurality of objects to be measured are included, a step of acquiring digital images with a predetermined time interval in the process of scanning, a coarse measuring step of detecting the objects to be measured in the digital image and of calculating a vertical angle and a horizontal angle of each of the objects to be measured based on a deviation of the objects to be measured on the digital image from sighting axis, and also, based on the results of detection from the angle detecting unit, and a step of associating the calculated vertical and horizontal angles with each of the objects to be measured and of storing the vertical and horizontal angles as target values for automatic sighting. As a result, the operator has no need to perform sighting for each of the objects to be measured in the teaching operation, and the sighting for a plurality of objects to be measured can be automatically performed. This contributes to the alleviation of the procedure for the sighting operation, and to the decrease of the time needed for sighting and to the improvement of working efficiency.

Also, the present invention provides the measuring method as described above, further comprising a precise measuring step of making the telescope perform the automatic sighting on the objects to be measured one after another based on the stored vertical angles and the stored horizontal angles and of performing distance measurement and angle measurement, and a step of associating the result of measurement obtained in the precise measurement with each of the objects to be measured and of acquiring the result of measurement as initial values. As a result, the searching operation to detect the objects to be measured is omitted when the precise measurement is performed by automatic sighting on a plurality of objects to be measured. The time required for precise measurement on a plurality of objects to be measured is extensively reduced.

Further, the present invention provides the measuring method as described above, wherein a scanning speed and a time interval of image pickup are set in such manner that images of each of the objects to be measured are included in at least two digital images adjacent to each other in terms of time. As a result, the results of detection can be averaged, and the measurement accuracy can be improved.

Also, the invention provides a measuring instrument as described above, comprising a telescope for performing sighting on objects to be measured, a distance measuring unit for measuring a distance to each of the objects to be measured by projecting a distance measuring light through the telescope, an image pickup unit for taking an image in sighting direction and for acquiring a digital image, angle detecting units for detecting a vertical angle and a horizontal angle in the sighting direction of the telescope, an automatic sighting unit for making the telescope perform automatic sighting to the objects to be measured, an arithmetic unit, and a storage unit, wherein the arithmetic unit makes the telescope rotate in horizontal direction and in vertical direction and perform scanning over a predetermined range as set so that a plurality of objects to be measured are included and makes the image pickup unit acquire digital images at a predetermined time interval in the process of scanning, and the arithmetic unit detects the objects to be measured in the digital images thus acquired, calculates a vertical angle and a horizontal angle of the objects to be measured based on the vertical angle and the horizontal angle detected by the angle detector and also based on a deviation of each of the objects to be measured on the digital images from sighting axis, associates the calculated vertical and horizontal angles with each of the objects to be measured, and makes the storage unit store the vertical angles and the horizontal angles of the objects to be measured as target values for automatic sighting. As a result, target values for sighting can be acquired in advance for a plurality of objects to be measured, and the operator has no need to perform sighting for each of the objects to be measured. The sighting for a plurality of objects to be measured can be automatically performed. This contributes to the alleviation of the sighting operation, to the reduction of the time required for sighting, and to the improvement of the working efficiency.

Further, the invention provides a measuring instrument as described above, wherein the arithmetic unit makes the automatic sighting unit automatically perform sighting of the telescope sequentially on the objects to be measured based on the target values stored in the storage unit, executes precise measurement for distance measurement and angle measurement, associates the result of measurement obtained in the precise measurement with the objects to be measured and acquires the result of measurement as initial values. As a result, it is possible to set up the initial value efficiently when the monitoring measurement is carried out.

Also, the invention provides a measuring instrument as described above, wherein the arithmetic unit takes images so that images of the objects to be measured are included in at least two digital images adjacent to each other in terms of time, and averages the vertical angles and the horizontal angles obtained with respect to the images of the objects to be measured in at least the two digital images. As a result, it is possible to improve the accuracy of measurement on the target value.

BRIEF DESCRIPTION OF THE DRAWINGS

FIG. 6 each represents an explanatory drawing to show a relation between field of view of a telescope and a reflective target in the present embodiment. FIG. 6 (A) shows a case where a single reflective target is included in a field of view of a telescope, and FIG. 6 (B) shows a case where two reflective targets are included in the field of view of the telescope.

DETAILED DESCRIPTION OF THE PREFERRED EMBODIMENT

Description will be given below on an embodiment of the present invention by referring to the attached drawings.

First, referring to FIG. 1, description will be given on a measuring system provided with a measuring instrument according to the present invention.

Figure 1:
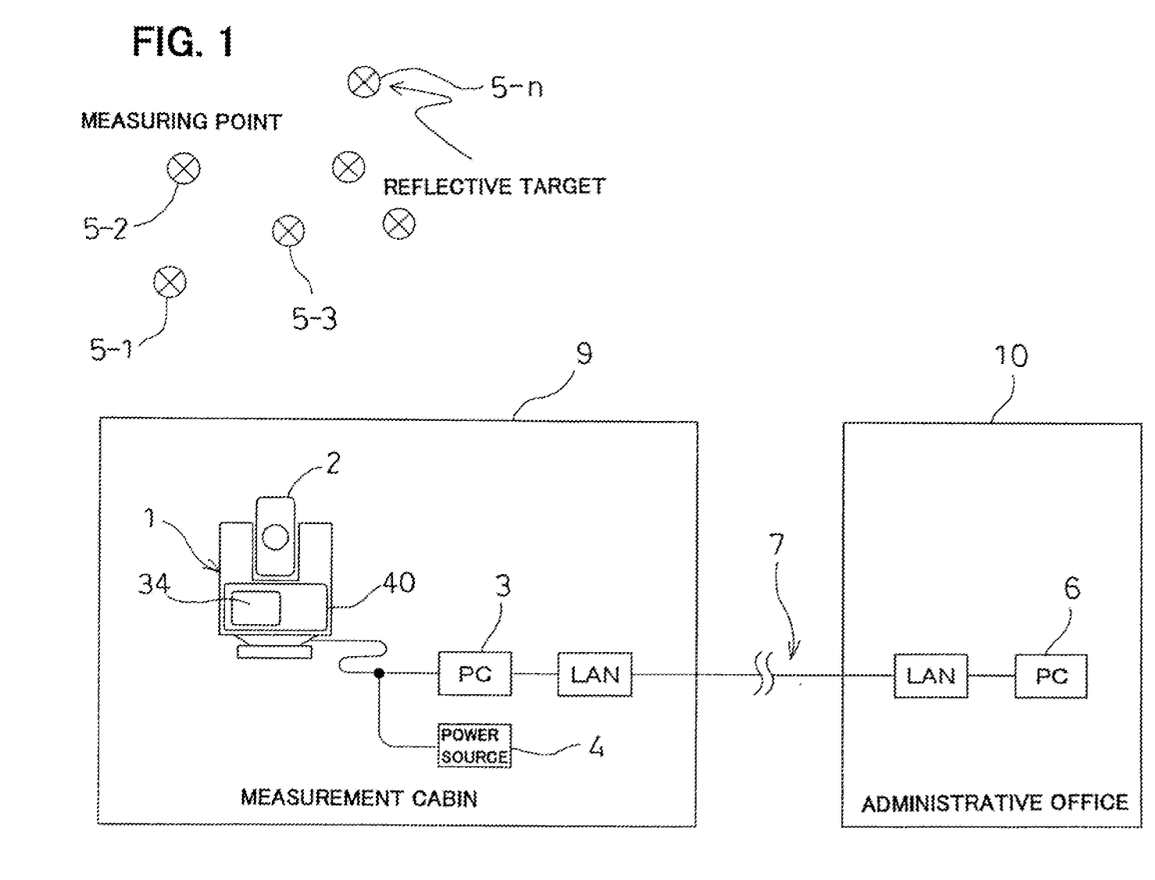
FIG. 1 is a schematical drawing to show system configuration, which includes a measuring instrument according to an embodiment of the present invention.

In FIG. 1, reference numeral 1 represents a measuring instrument to be installed in a measurement cabin 9. The measuring instrument 1 has a telescope unit 2 and can rotate the telescope unit 2 in horizontal and vertical directions, and the measuring instrument 1 has an automatic sighting function. Numeral 3 represents a measuring instrument PC. This measuring instrument PC 3 is electrically connected to the measuring instrument 1, or is integrated with the measuring instrument 1. The measuring instrument PC 3 issues instructions relating to the measurement to the measuring instrument 1, accumulates measurement data as acquired at the measuring instrument 1 or transmits the measured data to a base station PC 6. Numeral 4 represents a power source, and the power source 4 supplies electric power to the measuring instrument 1 and the measuring instrument PC 3. Although not shown in the figure, the measuring instrument 1 has a measuring function and has a horizontal angle measuring unit and a vertical angle measuring unit (see FIG. 3) for detecting the sighting direction of the telescope unit 2. Reference numerals 5-1, 5-2, 5-3, . . . 5-n each represents a reflective target installed at a measuring point.

The base station PC 6 is installed at an administrative office 10 to manage and administer tunnels, dams, etc. The base station PC 6 accumulates monitoring data transmitted from the measuring instrument PC 3 and compares the received monitoring data with the monitoring data received in the past, and judges the present state of tunnels, dams, etc.

The measuring instrument PC 3 and the base station PC 6 can transmit and receive data communication to and from each other via a communication means 7 as required such as LAN, telephone line, wireless communication, etc.

Figure 2:
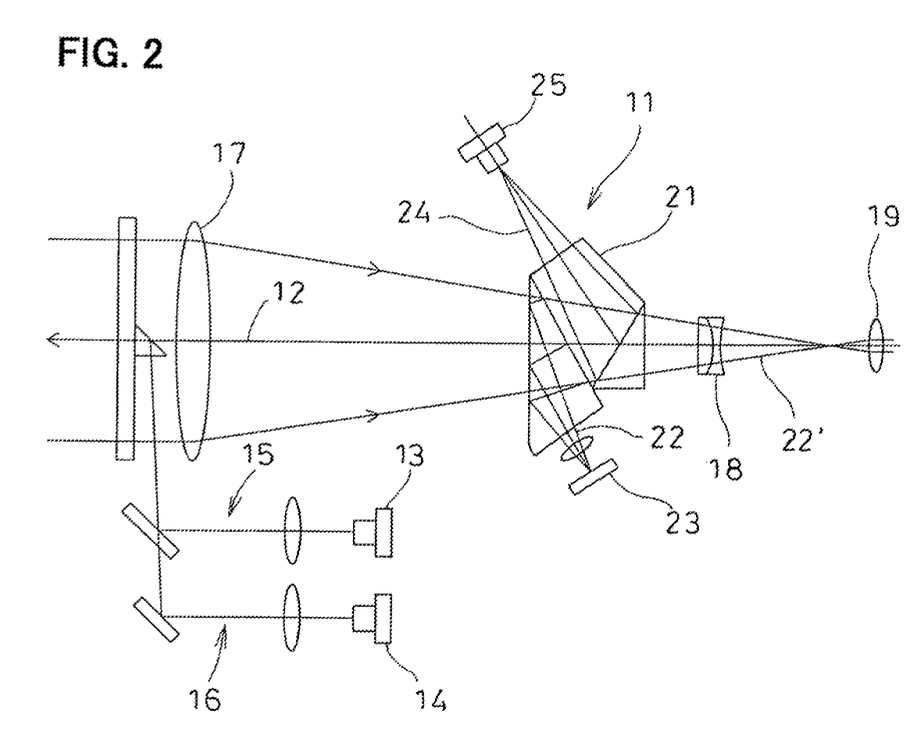
FIG. 2 is a drawing to show an optical system provided on the measuring instrument as described above.

FIG. 2 shows an optical system 11 of the measuring instrument 1. In FIG. 2, reference numeral 12 represents an optical axis (visual axis) of the optical system 11, numeral 13 represents a light source for distance measurement, numeral 14 represents a light source for sighting, numeral 15 represents a first light projecting optical system for guiding a distance measuring light from the light source 13 for distance measurement toward the optical axis 12, numeral 16 represents a second light projecting optical system for guiding a sighting light from the light source 14 for sighting toward the optical axis 12, numeral 17 represents an objective lens disposed along the optical axis 12, numeral 18 represents a focus lens disposed on the optical axis 12, and numeral 19 represents an eye piece.

The light source 13 for distance measurement emits a visible light as a distance measuring light, and the light source 14 for sighting emits a non-visible light such as infrared light as a sighting light. The distance measuring light emitted from the light source 13 for distance measurement and the sighting light emitted from the light source 14 for sighting are projected along the optical axis 12 respectively. A reflection light of the distance measuring light (hereinafter referred as a "reflected distance measuring light") and a reflection light of the sighting light (hereinafter referred as a "reflected sighting light") enter the objective lens 17 and are converged. Along the optical axis 12, a dichroic prism 21 is disposed. The dichroic prism 21 reflects a reflected sighting light 22. The reflected sighting light 22 is separated by the dichroic prism 21, and a part of the reflected sighting light 22 thus separated by the reflection enters an image sensor 23. A reflected distance measuring light 24 is reflected and separated by the dichroic prism 21, and the reflected distance measuring light 24 thus separated enters a photodetection element 25 for distance measurement. After passing through the dichroic prism 21, a natural light 22' passes through the focus lens 18 and enters the eye piece 19.

The image sensor 23 is CCD, CMOS sensor, etc., each of which is an aggregate of pixels, for instance, and the image sensor 23 outputs a digital signal. A position of the received pixel can be specified on a light receiving surface (image pickup surface). Further, it is so designed that a center of the image sensor 23 coincides with the optical axis 12. By obtaining a position of the pixel on the image sensor 23, a field angle with respect to the optical axis 12 (i.e. an angle with respect to the optical axis obtained from the position of the pixel) can be acquired. The optical system 11, the image sensor 23, etc. make up together an image pickup unit, which takes a digital image.

In the present embodiment, the reflective target 5 is detected from the digital image acquired by the image sensor 23, and it is so designed that a position of the reflective target 5 on the image is detected and a position of the reflective target 5 (a vertical angle and a horizontal angle) are detected from a vertical angle and a horizontal angle of the optical axis 12.

Figure 3:
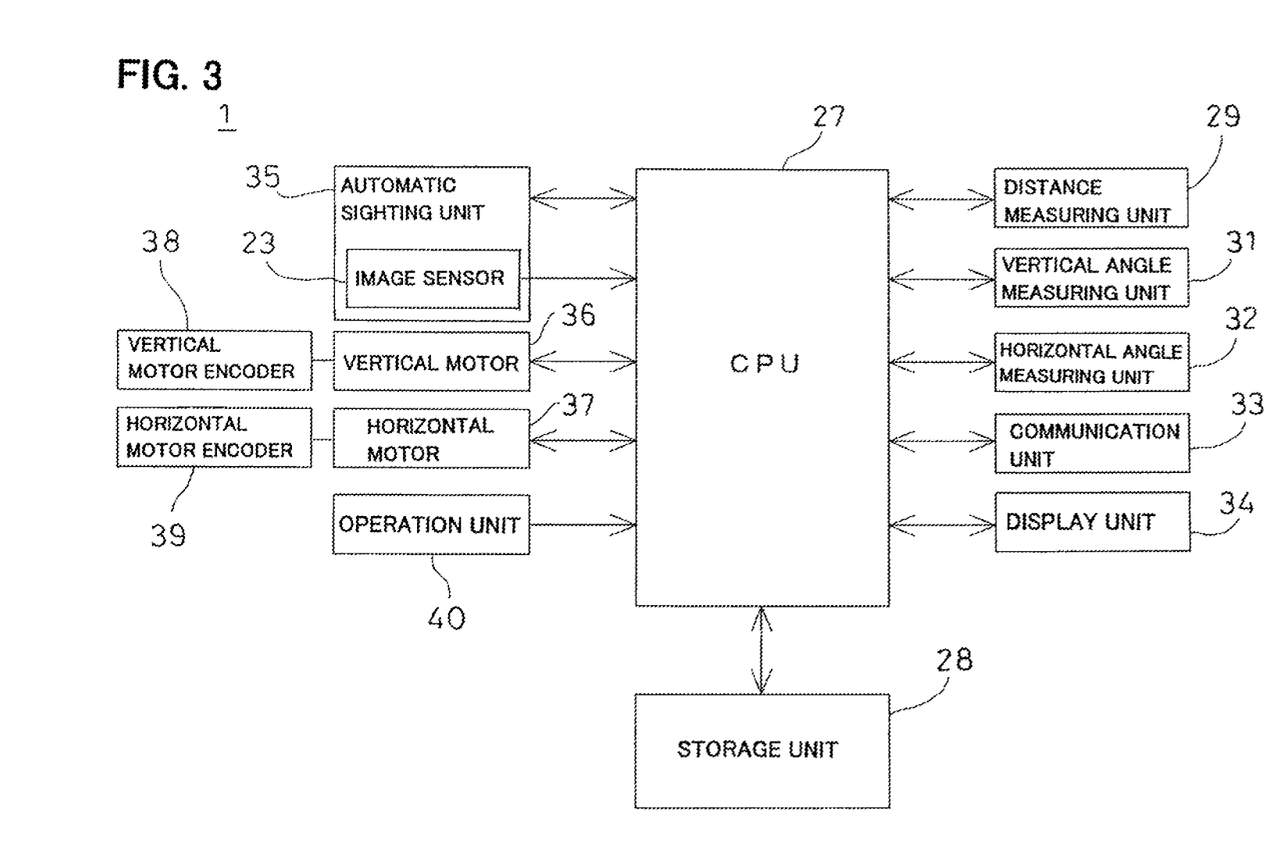
FIG. 3 is a schematical block diagram of the measuring instrument as given above.

FIG. 3 is a schematical block diagram to show an approximate system configuration of the measuring instrument 1. In FIG. 3, reference numeral 27 represents an arithmetic unit typically represented by CPU, numeral 28 represents a storage unit, numeral 29 represents a distance measuring unit, numeral 31 represents a vertical angle measuring unit, numeral 32 represents a horizontal angle measuring unit, numeral 33 represents a communication unit, numeral 34 represents a display unit, numeral 35 represents an automatic sighting unit, numeral 36 represents a vertical motor for rotating the telescope unit 2 in vertical direction, numeral 37 represents a horizontal motor for rotating the telescope unit 2 in horizontal direction, numeral 38 represents a vertical motor encoder installed on the vertical motor 36, numeral 39 represents a horizontal motor encoder installed on the horizontal motor 37, and numeral 40 represents an operation unit.

The distance measuring unit 29 comprises the light source 13 for distance measurement, the photodetection element 25 for distance measurement, the arithmetic unit 27, the storage unit 28, etc., and the distance measuring unit 29 performs distance measurement based on the reflected distance measuring light as received at the photodetection element 25 for distance measurement.

The automatic sighting unit 35 comprises the light source 14 for sighting, the image sensor 23, the arithmetic unit 27, the storage unit 28, etc. A reflected sighting light from the reflective target 5 is received at the image sensor 23, and automatic sighting is performed so that a sighting optical axis coincides with the reflective target 5 based on the result of light receiving.

The vertical angle measuring unit 31 measures a vertical angle of the sighting optical axis of the telescope unit 2 and sends the result of the measurement to the arithmetic unit 27 as an electric signal. The horizontal angle measuring unit 32 has a reference point and measures a horizontal angle of the sighting optical axis with respect to the reference point, and the result of the measurement is sent to the arithmetic unit 27.

The vertical motor 36 and the horizontal motor 37 are driven and controlled by the arithmetic unit 27. A rotation amount and a rotation speed of the vertical motor 36 are detected by the vertical motor encoder 38 installed on the vertical motor 36, and a rotation amount and a rotation speed of the horizontal motor 37 are detected by the horizontal motor encoder 39 installed on the horizontal motor 37.

The arithmetic unit 27 drives the distance measuring unit 29 and measures a distance according to a program (to be described later) stored in the storage unit 28, and drives the automatic sighting unit 35 and performs automatic sighting. Further, the arithmetic unit 27 performs three-dimensional measurement with respect to the reflective targets 5 respectively based on the results of measurement from the distance measuring unit 29, the vertical angle measuring unit 31, and the horizontal angle measuring unit 32. The results of the measurements thus obtained are transmitted to the measuring instrument PC 3.

In the storage unit 28, various types of programs are stored. These programs include: a measurement program for making the measuring instrument 1 perform the measuring operation and for acquiring three-dimensional data of each of the measuring points (i.e. the reflective target 5), and a sequence program for sequentially searching the measuring points and for carrying out operation such as acquisition of images by the image sensor 23, an image processing program for detecting the reflective target 5 from the image acquired by the image sensor 23, and an automatic sighting program for performing sighting of the telescope unit 2 to the reflective target 5 based on the result of detection of the reflective target 5, and a teaching program for executing the automatic sighting program and the measurement program and for carrying out teaching operation based on the data measured on each of the reflective targets 5, a monitoring program for carrying out the automatic sighting program and the measurement program at a predetermined time interval based on the results of the teaching operation, for detecting a position of each of the measuring points and for storing the results of detection to the storage unit 28 in time series, and other types of programs.

Next, description will be given below on the measuring unit PC 3.

The measuring instrument 1 executes the teaching operation or the monitoring operation and the data of the measuring points obtained by the teaching operation and the monitoring operation are transmitted to the measuring instrument PC 3, and the measuring instrument PC 3 matches the data of the measuring points to each of the reflective targets 5 in time series and reserves and stores the data of the measuring points in time series.

Further, the measuring instrument PC 3 has programs such as a control program for making the measuring instrument 1 carry out the teaching or the monitoring and an abnormality judging program for calculating based on the measurement data as to whether there is displacement or not and as to the extent of displacement for each of the reflective targets (measuring points) and for judging whether there is any abnormality or not.

Figure 4:
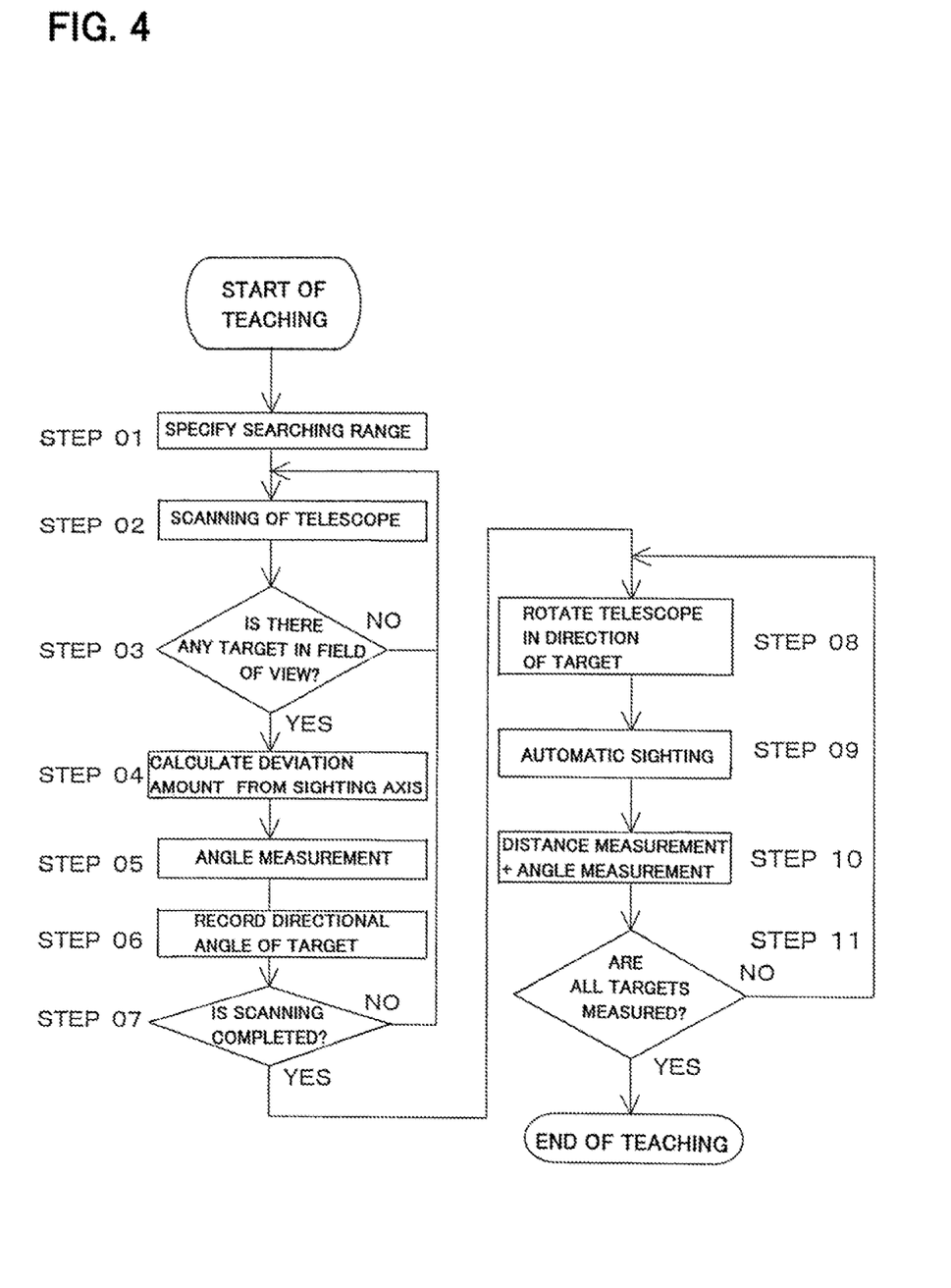
FIG. 4 is a flowchart to show operation of the embodiment of the present invention.

Next, referring to FIG. 4, description will be given on the teaching operation of the present embodiment.

(Step 01) A reference point and a range where the measuring point is present (i.e. a searching range) are specified. As an actual method to specify the range, for instance, the telescope unit 2 is directed toward the positions of a starting point and a finishing point for performing the teaching operation, and measuring angle values at each time are acquired from the vertical angle measuring unit 31 and the horizontal angle measuring unit 32. To direct the telescope unit 2 toward positions of the starting point and the finishing point for carrying out the teaching operation, the telescope unit 2 may be moved directly by an operator or may be moved by remote control from the measuring instrument PC 3. Or, the angle measuring value may be directly specified from the operation unit 40 of the measuring instrument 1 or may be specified by remote control from the measuring instrument PC 3. In case the display unit 34 is designed as a touch panel, the starting point and the finishing point are set up on the display unit 34.

In case the reference points and the measuring points are present over total circumference, or are present in wide range, the position of the starting point and the position of the finishing point are not specified, and by rotating the telescope unit 2 over an angle of 360° with respect to the vertical axis, the teaching operation may be performed over total circumference. Important is that the specifying is made for a range a little wider than the range where the reference points and the measuring points are present so that all of the reflective targets 5 can be discovered reliably.

(Step 02) When the specifying of the searching range has been completed, a searching operation is carried out, and image processing is performed with respect to the objects to be measured within the searching range, and a coarse measurement is carried out based on the measured angle in the sighting direction of the telescope unit 2. The execution of the searching operation and the execution of the coarse measurement are instructed from the measuring instrument PC 3.

Figure 5:
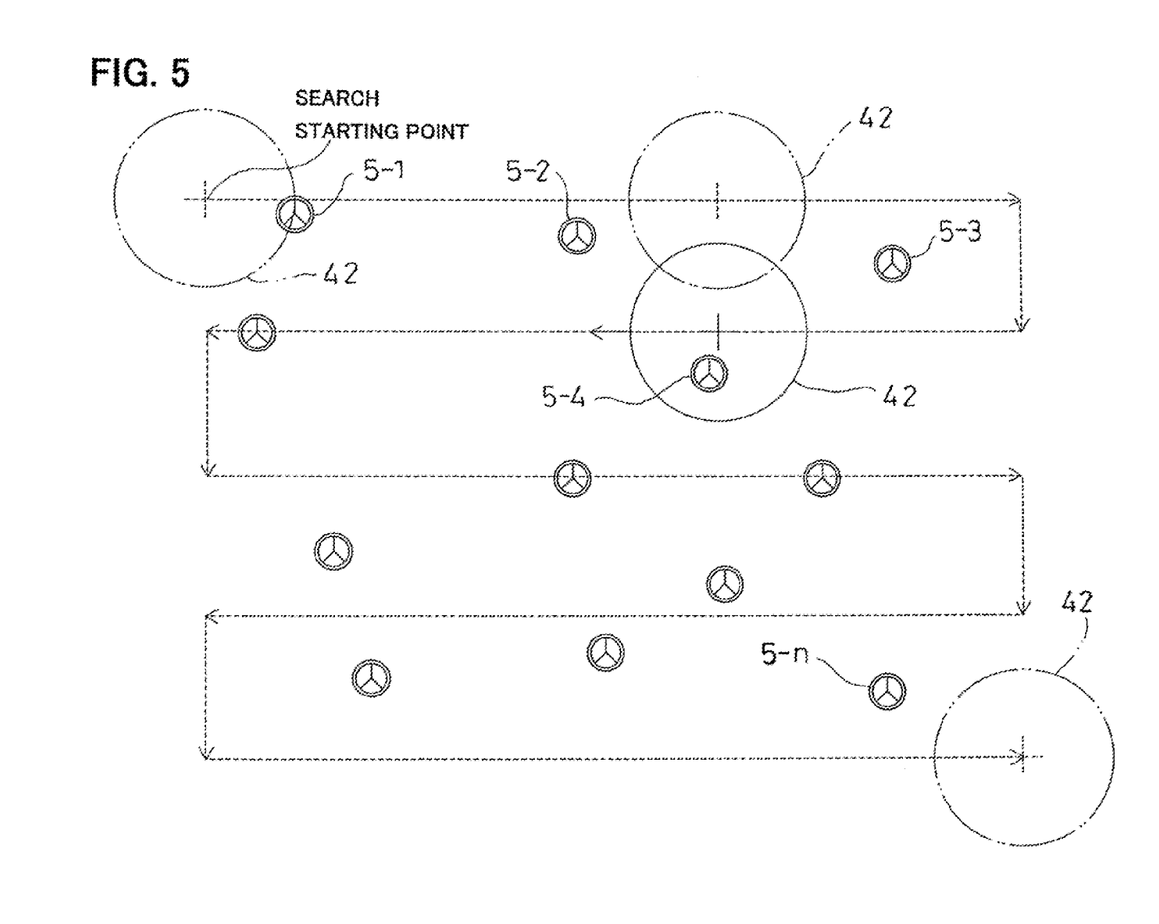
FIG. 5 is an explanatory drawing to show a relation of scanning loci, field of view of a telescope and a reflective target in the present embodiment.

FIG. 5 shows condition of the searching operation. When the searching range is specified, by using the searching function of the measuring instrument 1, the vertical motor 36 and the horizontal motor 37 are driven, and the telescope unit 2 is reciprocally scanned in horizontal direction, and is rotated in vertical direction at a predetermined angle at the end of horizontal scanning. By reciprocal scanning in horizontal direction and by the rotation in vertical direction at the end of the horizontal scanning, scanning can be performed over total searching range. In this case, the predetermined rotation angle in vertical direction will be set to an angle smaller than the view angle in vertical direction of a field of view 42 of the telescope unit 2 so that the field of view in the upper scanning and the field of view in the lower scanning will be superimposed on each other in a predetermined range.

(Step 03) Scanning is performed at a predetermined speed, and image data are acquired by the image sensor 23 at a predetermined time interval during the scanning process. Then, it is detected from the image data as to whether there is the reflective target 5 within field of view of the image sensor 23 or not. No specifying is given on the pattern of the scanning, however, the field of view 42 of the telescope unit 2 is in circular shape. Therefore, in case the scanning is performed in horizontal direction and in case the reflective target 5 is present near an upper end or a lower end of the field of view 42 of the telescope unit 2, the reflective target 5 comes into the field of view 42 only at a single moment. For this reason, the reflective target 5 may not be discovered. Accordingly, the scanning is performed in horizontal direction with superimposed a little in up-to-bottom direction of the field of view 42 (See FIG. 5). Similarly, in case the scanning is performed in vertical direction, the time interval and the scanning speed to acquire the images are set in such manner that the images can be acquired as superimposed a little on each other in left-to-right direction of the field of view 42.

(Step 04) In case the reflective target 5 is discovered in the image obtained during the scanning process, a measured angle value (H1, V1) of the measuring instrument 1 at the moment and a deviation amount (X1, Y1) between the reflective target 5 and the optical axis 12 on the image sensor 23 are measured and determined as a pixel position.

(Step 05) The deviation amount (X1, Y1) from the optical axis 12 is converted to an angle value (field angle) ($\delta$H1, $\delta$V1). At the time when the deviation amount is obtained, the angle of the optical axis 12 of the telescope unit 2 is acquired from the vertical angle measuring unit 31 and the horizontal angle measuring unit 32. Then, based on the vertical angle and the horizontal angle of the optical axis 12 as detected by the vertical angle measuring unit 31 and the horizontal angle measuring unit 32, and also, based on angle values of the image sensor 23, angle measurement (calculation) is performed on the directional angle (TH, TV) of the reflective target 5 according to the following equation:

$$TH1 = H1 + \delta H1; TV1 = V1 + \delta V1$$

(Step 06) Directional angle (TH, TV) of the reflective target 5 thus calculated is associated with the corresponding reflective target 5, and is transmitted to the measuring instrument PC 3. At the measuring instrument PC 3, an identification number is put to the reflective target 5, and the result of angle measurement is associated with the identification number and is recorded in time series. The results of the angle measurement thus recorded will be a target value when automatic sighting is carried out as described later.

(Step 07) It is judged whether angle measurement has been carried out for all of the reflective targets 5 or not, and the entire searching range is scanned. Then, the angle measurement is performed on all of the reflective targets 5.

When the measurement (coarse measurement) of the direction angle has been completed for all of the reflective targets 5, three-dimensional measurement (precise measurement) is started on each individual reflective target 5 based on the results of angle measurement (target value) of the reflective targets 5.

(Step 08) Based on the results of the angle measurement, the telescope unit 2 is turned in the direction of the target value in a predetermined sequence, e.g. in the sequence of identification number. In this case, it would suffice that a target comes within the field of view of the telescope unit 2.

By changing the direction of the telescope unit 2 based on the angles of the vertical motor encoder 38 and the horizontal motor encoder 39, the sighting in approximate direction can be performed more quickly than the case where the operation is based on angles of the vertical angle measuring unit 31 and the horizontal angle measuring unit 32.

(Step 09) When a reflective target 5, on which sighting is to be performed, is present in the direction of a target value and the reflective target 5, on which sighting is to be performed, comes into the field of view 42 of the telescope unit 2, the reflective target 5 in the image of the image sensor 23 is detected. Then, a deviation of the reflective target 5 with respect to the optical axis 12 is obtained, and the vertical motor 36 and the horizontal motor 37 are driven and controlled so that the deviation will be 0, and automatic sighting is carried out.

(Step 10) When the sighting is completed, the distance measurement is performed by the distance measuring unit 29, and the angle measurement is carried out on the vertical angle and the horizontal angle by the vertical angle measuring unit 31 and the horizontal angle measuring unit 32. The results of the distance measurement and the results of the angle measurement are associated with the reflective target 5 as teaching data and also associated with the measuring time and are recorded and stored in the storage unit 28. The teaching data may be transmitted to the measuring instrument PC 3 via the communication unit 33 and may be recorded and stored in the measuring instrument PC 3.

(Step 11) When the distance measurement and the angle measurement have been performed on all of the reflective targets 5, the teaching operation is completed, and the teaching data are stored in the storage unit 28 or in the measuring instrument PC 3. When the teaching operation has been completed and the teaching data have been acquired, automatic monitoring measurement can be carried out.

Now, brief description will be given below on the monitoring measurement. According to the present embodiment, three modes of monitoring measurement can be carried out: the coarse monitoring measurement, the precise monitoring measurement, or a combination of the coarse monitoring measurement and the precise monitoring measurement.

First, referring to FIG. 6, description will be given on the first mode, i.e. the coarse monitoring measurement.

According to an instruction to start the monitoring measurement from the measuring instrument PC 3, the telescope unit 2 is rotated, and the searching range is scanned at a predetermined speed. During the process of scanning, sampling is performed on the images obtained by the image sensor 23 at a predetermined time interval, or at a predetermined angular interval (in the figure, at every predetermined horizontal rotation angle). The largest image obtained by the image sensor 23 will be equal to the field of view of the telescope unit 2. From the images thus sampled, the reflective target 5 is detected. Then, angle values (field angles) ($\delta$H, $\delta$V) of the reflective target 5 in the images are obtained. Further, from the field angle and the sighting direction of the telescope unit 2 at the time of sampling, i.e. from the horizontal angle and the vertical angle (H, V), directional angles (TH, TV) of the reflective target 5 are determined. Even when the measuring point is displaced, there is almost no change in the horizontal distance from the measuring instrument 1 to the measuring point, and these directional angles (TH, TV) are acquired as monitoring data.

Figure 6A:
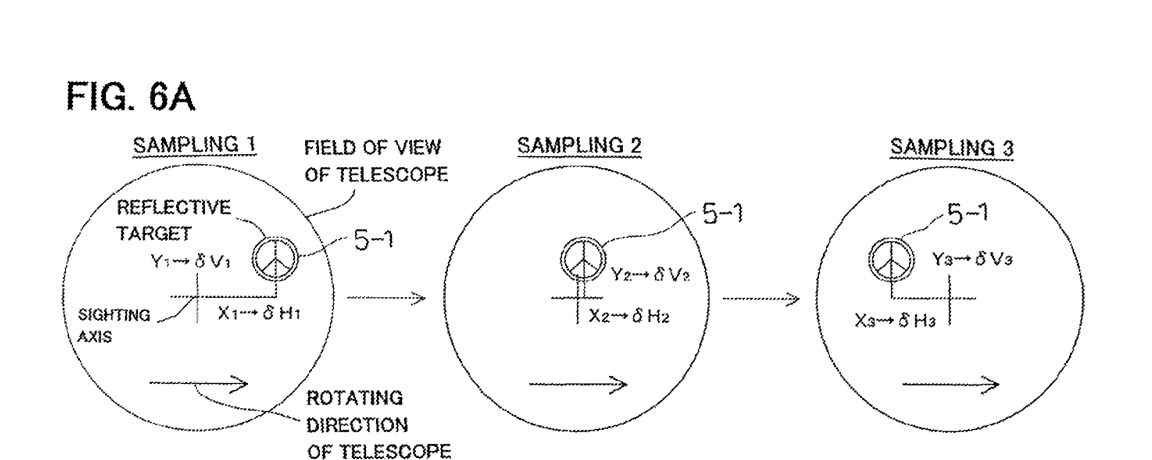

FIG. 6 (A) shows a case where a single reflective target 5 is detected in the field of view of the telescope unit 2 under scanning. FIG. 6 (A) also shows a case where a single reflective target 5-1 is included in three images, which are adjacent to each other in terms of time in the scanning process. Because the optical axis is moved as a result of the scanning, the position of the reflective target 5 in the image is changed. Therefore, three measurement values (measured angles) can be obtained with respect to the reflective target 5-1, and the three measurement values are averaged by statistical processing such as the least square method. By the averaging, measurement accuracy of the reflective target 5-1 can be improved.

Therefore, the interval of sampling is preferably an interval that at least two images are obtained on the same reflective target 5 within the time period, during which field of view of the telescope unit 2 passes through the reflective target 5. Sampling interval is determined by frame rate (i.e. it is determined at the timing of image acquisition). Therefore, by scanning on the same reflective target at such speed that two or more sampling images each including the reflective target in question can be acquired, and by averaging two or more directional angles of the reflective target 5 thus obtained, the accuracy of the monitoring data can be increased.

Figure 6B:
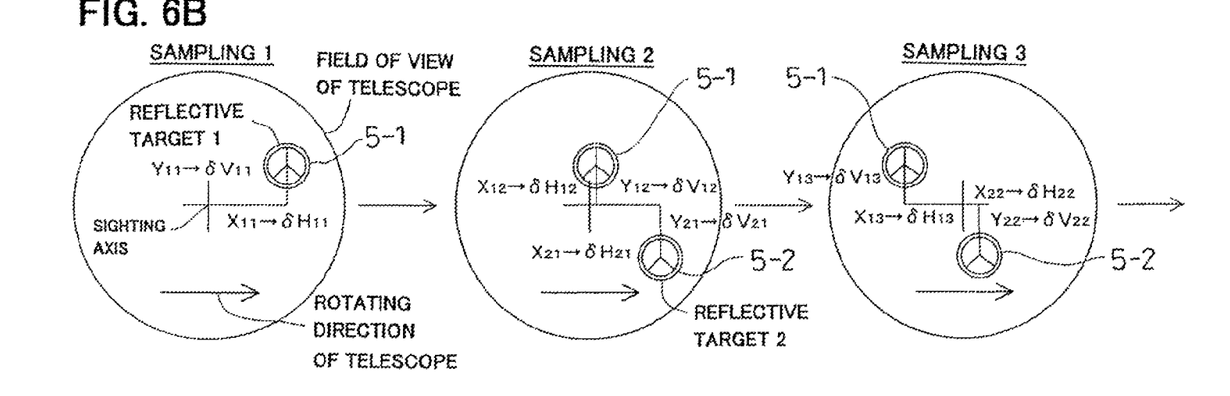

FIG. 6 (B) shows a case where two reflective targets 5-1 and 5-2 are detected in field of view of the telescope unit 2 currently being scanned. When a plurality of the reflective targets 5-1 and 5-2 are included in the image, an angle value in the image is obtained for each of the reflective targets 5-1, 5-2 with reference to the sighting axis and from the angle values and the sighting direction, directional angles (TH, TV) of the reflective targets 5-1 and 5-2 are determined respectively.

Then, for all of the reflective targets 5 in the searching range, directional angles are measured by monitoring, and the monitoring data are transmitted to the measuring instrument PC 3. At the measuring instrument PC 3, the monitoring data and the teaching data are compared with each other, and it is judged whether there is any change at the measuring point or not, or whether an amount of change exceeds a preset threshold value or not. If there is any change in the measuring point, or when the amount of change exceeds the threshold value, an alarm signal is transmitted from the measuring instrument PC 3 to the base station PC 6 via the communication means 7.

In the coarse monitoring measurement of the first mode, the moving of the telescope unit 2 is not stopped for each of the reflective targets 5, and one cycle of the monitoring measurement is the same as the time period of the scanning on the searching range. Accordingly, the period (cycle) of the monitoring measurement can be extensively made shorter, and the quality of working is improved. In the monitoring measurement on a portion where there is more displacement, the period (cycle) of the monitoring measurement is shortened, and the displacement of the measuring point is detected more quickly and more reliably.

Next, description will be given on the precise monitoring measurement of the second mode.

From the teaching procedure as described above, the positions in the initial state of all of the reflective targets 5, i.e. directional angles (TH, TV) of all of the reflective targets 5, are known. Therefore, based on the directional angles, the telescope unit 2 is sequentially directed to all of the reflective targets 5 in the order of the identification number.

When the telescope unit 2 is directed to the reflective target 5, automatic sighting is carried out. When the optical axis 12 coincides with the reflective target 5, distance measurement and angle measurement are performed, and the data are acquired as precise monitoring data. The precise monitoring data are transmitted to the measuring instrument PC 3. The monitoring data are compared with the teaching data, and it is judged whether there is any change in the measuring point or not, or whether the amount of change exceeds the preset threshold value or not. When there is any change in the measuring point, or when the amount of change exceeds the threshold value, an alarm signal is issued from the measuring instrument PC 3 to the base station PC 6 via the communication means 7.

Now, description will be given below on the monitoring measurement of the third mode where the coarse monitoring measurement is combined with the precision monitoring measurement.

First, the monitoring measurement is performed in the mode of the coarse monitoring measurement, and directional angles (TH, TV) of the reflective target 5 are determined from the acquired sampling image. Then, it is judged whether there is any change at the measuring point or not, or whether the amount of change exceeds the preset threshold value or not. Next, in the result of the coarse monitoring measurement, in case the directional angles (TH, TV) of the reflective target 5 thus measured exceed the preset threshold value with respect to the directional angle of the reflective target 5 at the time of the teaching operation, the precise monitoring measurement is performed on the reflective target 5, which exceeds the threshold value. Specifically, based on the directional angle at the time of teaching operation of the reflective target 5, which exceeds the threshold value, the telescope unit 2 is directed to the reflective target 5. By automatic sighting, the optical axis 12 is made coincident with the reflective target 5. Then, distance measurement and angle measurement are carried out, and the precise monitoring data are acquired.

For the reflective target 5, the precise monitoring data are compared with the data at the time of teaching. In case there is a change at the measuring point or in case the amount of change exceeds the threshold value, an alarm signal is issued from the measuring instrument PC 3 to the base station PC 6 via the communication means 7.

In the monitoring measurement of the third mode, the precise measurement is performed only on the reflective target 5, which is displaced or which seems to be displaced beyond the threshold value. As a result, operation of the monitoring measurement can be performed more quickly while the monitoring measurement accuracy is maintained at high level.

As described above, according to the present embodiment, three modes of monitoring measurement can be accomplished: the coarse monitoring measurement, the precise monitoring measurement, and a combination of the coarse monitoring measurement and the precise monitoring measurement.

The invention claimed is:

1. A measuring method for performing monitoring measurement on a plurality of objects to be measured by a measuring instrument, which comprises a telescope for performing sighting on the objects to be measured, a distance measuring unit for measuring a distance to each of the objects to be measured by projecting a distance measuring light through said telescope, an image pickup unit for taking an image in sighting direction and for acquiring a digital image, angle detecting units for detecting a vertical angle and a horizontal angle in the sighting direction of said telescope, and an automatic sighting unit for making said telescope perform automatic sighting to the objects to be measured, comprising a coarse measuring step and a precise measuring step, wherein said coarse measuring step comprises:

a step of rotating said telescope in horizontal direction and in vertical direction and of scanning over a predetermined range as set so that a plurality of objects to be measured are included, a step of acquiring digital images with a predetermined time interval in the process of scanning, a measuring step of detecting the objects to be measured in said digital image and of calculating a vertical angle and a horizontal angle of each of the objects to be measured based on a deviation of the objects to be measured on said digital image from sighting axis, and also, based on the results of detection from said angle detecting units, and a step of associating said calculated vertical and horizontal angles with each of the objects to be measured and of storing the vertical and horizontal angles as target values for automatic sighting, and wherein said precise measuring step comprises:

a step of making said telescope perform the automatic sighting on the objects to be measured one after another based on said stored vertical angles and said stored horizontal angles and of performing distance measurement and angle measurement, and a step of associating the obtained measurement results with each of the objects to be measured and of acquiring the result of measurement as initial values.

2. A measuring method according to claim 1, wherein a scanning speed and a time interval of image pickup are set in such manner that images of each of the objects to be measured are included in at least two digital images adjacent to each other in terms of time.

3. A measuring instrument, comprising a telescope for performing sighting on objects to be measured, a distance measuring unit for measuring a distance to each of the objects to be measured by projecting a distance measuring light through said telescope, an image pickup unit for taking an image in sighting direction and for acquiring a digital image, angle detecting units for detecting a vertical angle and a horizontal angle in the sighting direction of said telescope, an automatic sighting unit for making said telescope perform automatic sighting to the objects to be measured, an arithmetic unit, and a storage unit, wherein said arithmetic unit executes a coarse measurement and precise measurement, said coarse measurement makes said telescope rotate in horizontal direction and in vertical direction and perform scanning over a predetermined range as set so that a plurality of objects to be measured are included and makes said image pickup unit acquire digital images at a predetermined time interval in the process of scanning, and said arithmetic unit detects the objects to be measured in the digital images thus acquired, calculates a vertical angle and a horizontal angle of the objects to be measured based on the vertical angle and the horizontal angle detected by said angle detecting units and also based on a deviation of each of the objects to be measured on said digital images from sighting axis, associates said calculated vertical and horizontal angles with each of the objects to be measured, and makes said storage unit store said vertical angles and said horizontal angles of the objects to be measured as target values for automatic sighting, and said precise measurement makes said automatic sighting unit automatically perform sighting of said telescope sequentially on the objects to be measured based on said target values, and makes said distance measuring unit and said angle detecting units executes precise measurement on said objects to be measured, and associates the obtained measurement result with said objects to be measured and acquires the result of measurement as initial values.

4. The measuring instrument according to claim 3, wherein said arithmetic unit takes images so that images of the objects to be measured are included in at least two digital images adjacent to each other in terms of time, and averages said vertical angles and said horizontal angles obtained with respect to the images of the objects to be measured in at least the two digital images.

* * * * *